(12) United States Patent
Baxter et al.

(10) Patent No.: US 6,219,663 B1
(45) Date of Patent: Apr. 17, 2001

(54) METHOD AND COMPUTER PROGRAM PRODUCT FOR IMPLEMENTING PUSHDOWN QUERY IN A DISTRIBUTED OBJECT MANAGEMENT SYSTEM

(75) Inventors: Randy Dee Baxter; Michael Dennis McKeehan; Mark Alan Pasch; Erik Edward Voldal, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/121,778

(22) Filed: Jul. 23, 1998

(51) Int. Cl.[7] ........................................ G06F 17/30
(52) U.S. Cl. ...................... 707/3; 707/2; 707/1; 707/4; 707/5; 707/7; 707/9; 707/10
(58) Field of Search .................... 707/1, 2, 3, 4, 707/5, 7, 9, 10, 204; 717/14

(56) References Cited

U.S. PATENT DOCUMENTS

| | | | |
|---|---|---|---|
| 5,588,150 | * 12/1996 | Lin et al. ................................. | 707/1 |
| 5,613,106 | * 3/1997 | Thurman et al. ..................... | 707/204 |
| 5,892,949 | * 4/1999 | Noble ....................................... | 717/4 |
| 5,930,793 | * 7/1999 | Kleewein et al. ..................... | 707/10 |
| 5,966,706 | * 10/1999 | Biliris et al. ........................... | 707/10 |
| 6,092,062 | * 7/2000 | Lohman et al. ........................ | 707/2 |

OTHER PUBLICATIONS

IEEE publication, "A Rule Engine for Query Transformation in Starburst and IBM DB2 C/S DBMS" by Hamid Pirahesh et al., IBM Almaden Research Center, pp. 391–400, Apr. 1997.*

* cited by examiner

Primary Examiner—Thomas Black
Assistant Examiner—Diane Mizrahi
(74) Attorney, Agent, or Firm—Joan Pennington

(57) ABSTRACT

A method and computer program product are provided for implementing pushdown queries in a distributed object management system. A pushdown query to a system datastore is performed for a query type returning a single object. Responsive to the system datastore finding the match, checking whether the match refers to an object changed in the current transaction is performed. Responsive to the match not referring to a changed object, the object is returned. Responsive to the match referring to the changed object and the changed object matching the pushdown query, the changed object is returned. Responsive to the system datastore not finding the match, a list of changed objects in a current transaction is obtained. Each of the changed objects are in a current transactional state. An object query is performed on the changed objects in the list of changed objects. A multiple object pushdown query to the system datastore is performed for a query type returning multiple objects. Then the list of changed objects in the current transaction is obtained and the object query is performed on the changed objects. Results of the multiple object pushdown query and object query are merged and returned.

12 Claims, 5 Drawing Sheets

METHOD AND COMPUTER PROGRAM PRODUCT FOR IMPLEMENTING PUSHDOWN QUERY IN A DISTRIBUTED OBJECT MANAGEMENT SYSTEM

FIELD OF THE INVENTION

The present invention relates to the data processing field, and more particularly, relates to a method and computer program product for implementing pushdown queries in a distributed object management system.

DESCRIPTION OF THE RELATED ART

Pushdown queries in a distributed object management system are necessary for efficiently extracting data from an underlying persistent datastore. Pushdown queries rely on the datastore query facilities such as those found in a relational database. With the distribution of objects among several address spaces it becomes difficult to ensure efficient and correct pushdown query capability.

Objects that are distributed in the network may have changed state that affects the results of the pushdown query operation.

A need exists for a mechanism that allows a query to be pushed down to the datastore query facilities that detects and corrects for object state changes affecting the results of the query.

SUMMARY OF THE INVENTION

A principal object of the present invention is to provide a method and computer program product for implementing pushdown queries in a distributed object management system. Other important objects of the present invention are to provide such method and computer program product for implementing pushdown queries substantially without negative effect and that overcome some of the disadvantages of prior art arrangements.

In brief, a method and computer program product are provided for implementing pushdown queries in a distributed object management system. A pushdown query to a system datastore is performed for a query type returning a single object. Responsive to the system datastore finding the match, checking whether the match refers to an object changed in the current transaction is performed. Responsive to the match not referring to a changed object, the object is returned. Responsive to the match referring to the changed object and the changed object matching the pushdown query, the changed object is returned. Responsive to the system datastore not finding the match, a list of changed objects in a current transaction is obtained. Each of the changed objects are in a current transactional state. An object query is performed on the changed objects in the list of changed objects.

In accordance with features of the invention, a multiple object pushdown query to the system datastore is performed for a query type returning multiple objects. Then the list of changed objects in the current transaction is obtained and the object query is performed on the changed objects. Results of the multiple object pushdown query and object query are merged and returned.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
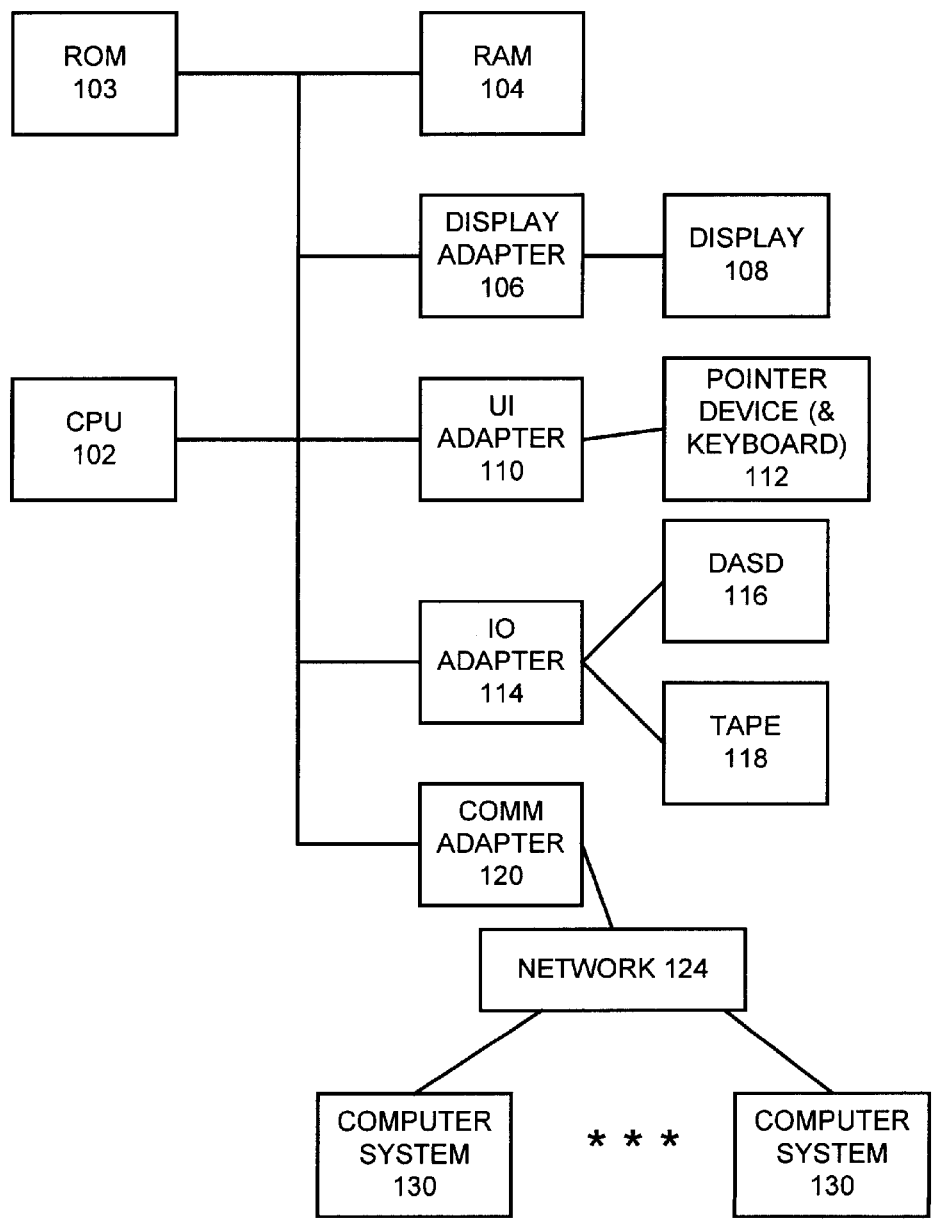
FIG. 1 is a block diagram representation illustrating a server computer system for implementing methods for pushdown queries in a distributed object management system in accordance with the preferred embodiment.
Figure 2:
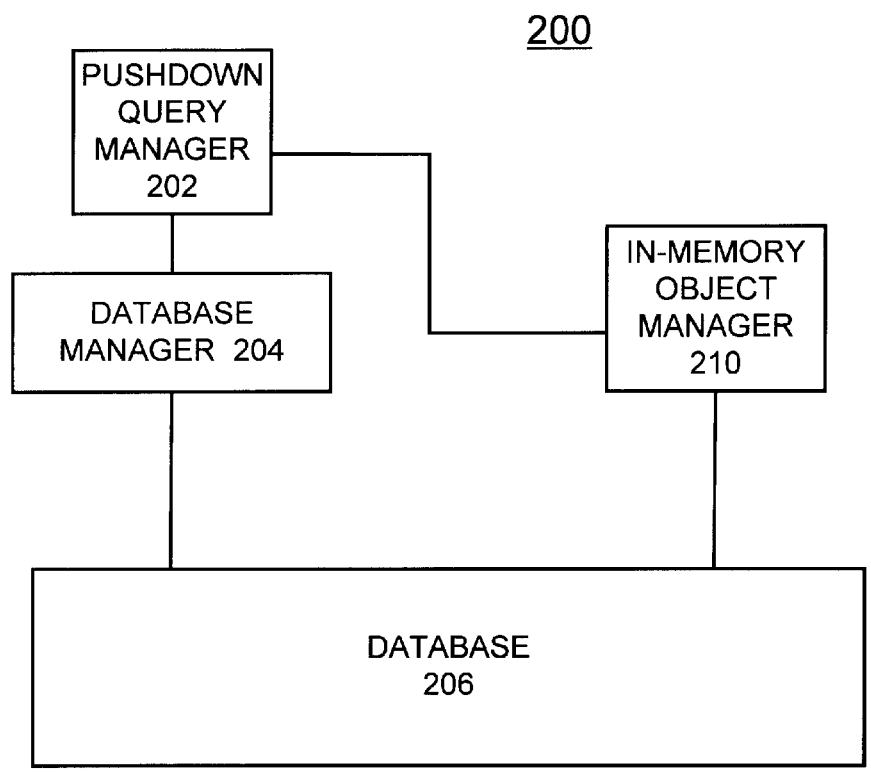
FIG. 2 is a block diagram representation illustrating a database system of the computer system of FIG. 1.

Having reference now to the drawings, in FIGS. 1 and 2, there is shown a server computer or data processing system of the preferred embodiment generally designated by the reference character 100. As shown in FIG. 1, server computer system 100 includes a central processor unit (CPU) 102, a read only memory 103, a random access memory or mainstore 104, and a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function for communicating with a network 124 connecting multiple distributed computer systems 130. It should be understood that the present invention is not limited to a computer server model with a single CPU, or other single component architectures as shown in FIG. 1.

As shown in FIG. 2, server computer system 100 includes a database system 200 including a pushdown query manager program 202 of the preferred embodiment used in conjunction with a database manager program 204 and a database 206. Server computer system 100 includes an in-memory object manager 210 of the preferred embodiment for maintaining a list of changed objects in a current transaction. Each of the changed objects are in a current transactional state.

Various commercially available processors could be used for computer system 100, for example, an IBM personal computer or similar workstation can be used. Central processor unit 102 is suitably programmed to execute the flowcharts of FIGS. 3 and 4 of the preferred embodiment.

In accordance with features of the invention, an effective and efficient pushdown query process is provided in a distributed object environment by focusing on how to best utilize the query support of the underlying datastore 206 while maintaining correct query semantics. Pushdown query methods of the preferred embodiment are provided by breaking queries into two types, queries returning a single object as illustrated and described with respect to FIG. 3 and queries returning multiple objects as illustrated and described with respect to FIG. 4. Efficiencies can be realized in a query that only returns a single object. A multiple object pushdown query that returns multiple objects of FIG. 4 has added complexity that are met in accordance with the preferred embodiment.

Figure 3:
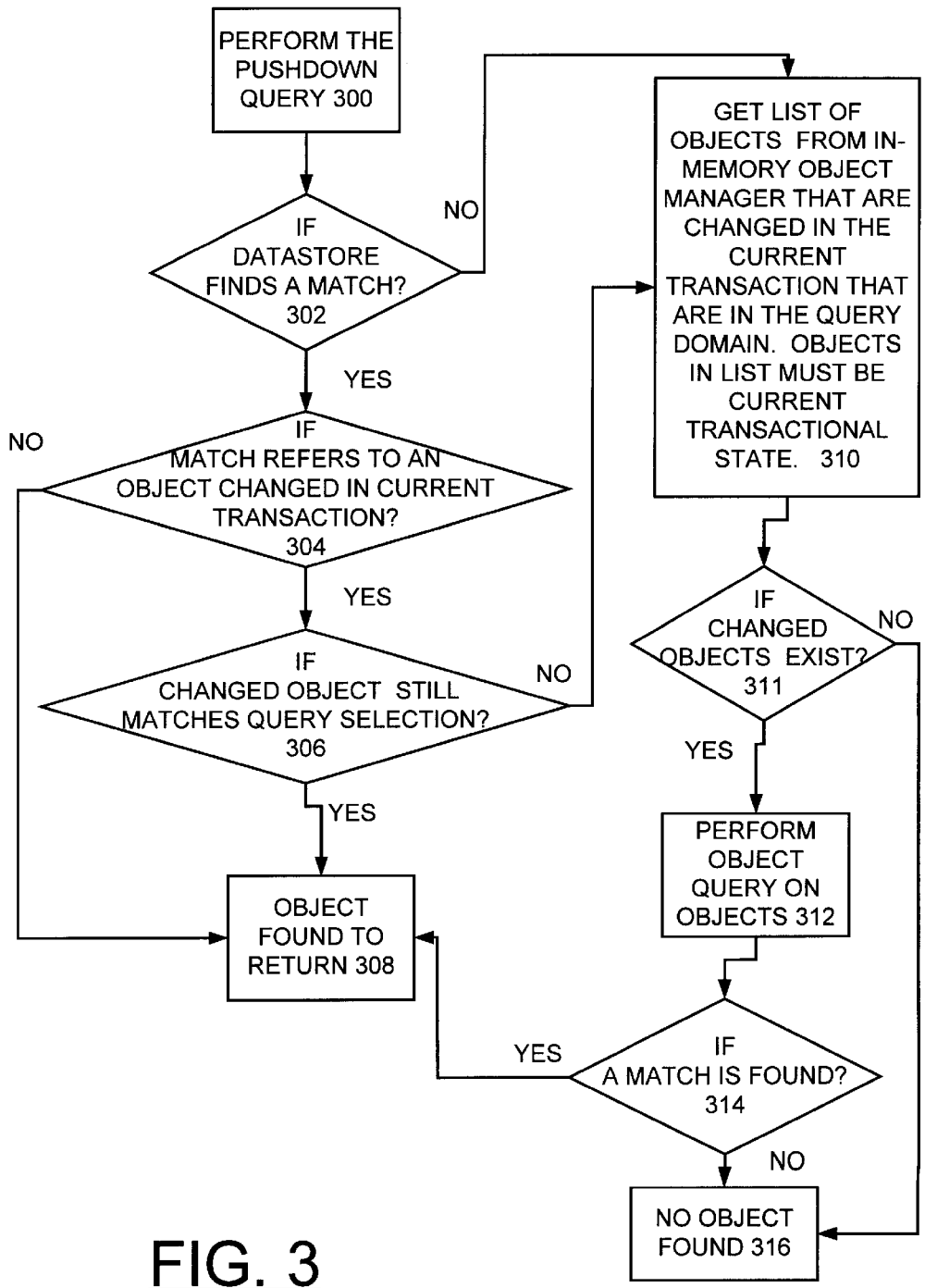
FIG. 3 is a flow chart illustrating sequential operations for implementing pushdown queries returning a single object in a distributed object management system in accordance with a preferred embodiment of the present invention.

Referring now to FIG. 3, the pushdown query process for queries returning a single object is shown. First a pushdown query is performed as indicated at a block 300. If the datastore finds a match as indicated at a decision block 302, and checking if the match refers to an object that has been changed in the current transaction or changed in memory, not in the datastore, is performed as indicated at a decision block 304. If the changed object still matches the query selection as indicated at a decision block 306, then the object found is to be returned as indicated at a block 308. Else, if the changed object does not still match the query selection at decision block 306, then the in-memory object manager 210 is asked for a list of objects that are changed in the current transaction that are in the query domain as indicated at a block 310. The objects in the list must be the objects current transactional state. This implies that objects in the list that are distributed to another process must have their state brought back by their controlling object manager. Then if changed objects exist as indicated at a decision block 311, the object query is performed on these objects as indicated at a block 312. If a match is found as indicated at a decision block 314, then the object found is to be returned as indicated at block 308. Else, if a match is not found at decision block 314, then no object found as indicated at a block 316.

Else, if the found object is not changed in current transaction at decision block 304, then the object found is to be returned as indicated at block 308. When the datastore did not find a match at decision block 302, then a list of objects that are changed in the current transaction that are in the query domain is obtained from the in-memory manager at block 310. The objects in the list must be the objects current transactional state. This implies that objects in the list that are distributed to another process must have their state brought back their controlling object manager. As described above, the object query is performed on these objects at block 312 and checking for a match at decision block 314. If a match is found at decision block 314, then the object found is to be returned as indicated at block 308. Else, if a match is not found at decision block 314, then no object is found at block 316.

Figure 4:
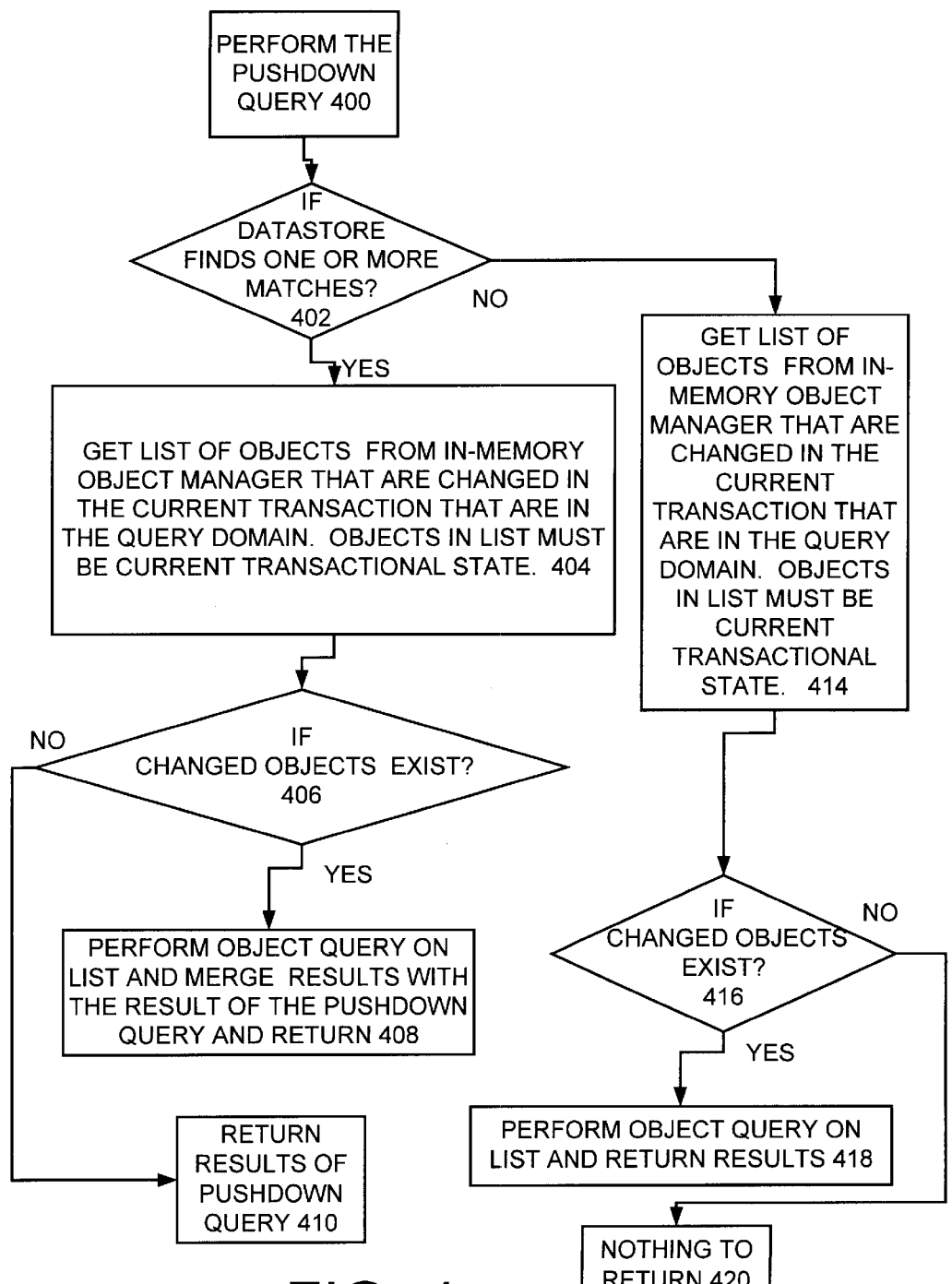
FIG. 4 is a flow chart illustrating sequential operations for implementing pushdown queries returning multiple objects in a distributed object management system in accordance with a preferred embodiment of the present invention.

Referring now to FIG. 4, the pushdown query process for queries returning multiple objects is shown. First a pushdown query is performed as indicated at a block 400. If the datastore finds one or more matches as indicated at a decision block 402, the in-memory object manager is asked for a list of objects that are changed in the current transaction that are in the query domain as indicated at a block 404. The objects in the list at block 404 must be the objects current transactional state. This implies that objects in the list that are distributed to another process must have their state brought back by their controlling object manager. Then checking if changed objects exist is performed as indicated at a decision block 406, If changed objects exist, the object query is performed on the list and the results are merged with the result of the pushdown query and returned as indicated at a block 408. Else, if no changed objects exist in current transaction, then the objects resulting from pushdown query are returned as indicated at a block 410. Else, if no object is found during pushdown query at block 402, then the in-memory object manager is asked for a list of objects that are changed in the current transaction that are in the query domain as indicated at a block 414. The objects in the list must be the objects current transactional state. This implies that objects in the list that are distributed to another process must have their state brought back their controlling object manager. Then if determined that changed objects exist as indicated at a decision block 416, then the object query is performed on the list and the results returned as indicated at a block 418. Else, if determined that no changed objects exist in current transaction at decision block 416, then there is nothing to return as indicated at a block 420.

Figure 5:
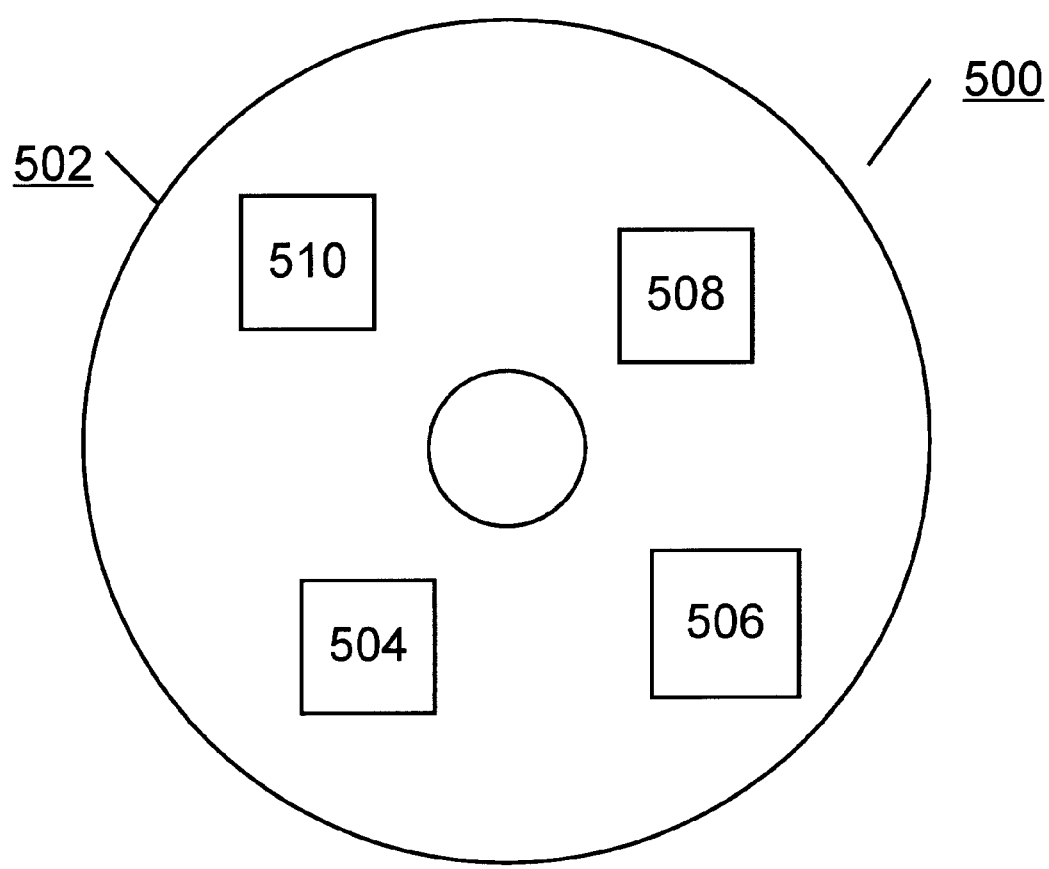
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 506, 504, 508, 510 on the medium 502 for carrying out the methods for implementing pushdown queries of the preferred embodiment in the system 100 of FIG. 1.

A sequence of program instructions or a logical assembly of one or more interrelated modules defined by the recorded program means 506, 504, 508, 510, direct the computer system 100 for implementing pushdown queries of the preferred embodiment.

While the present invention has been described with reference to the details of the embodiments of the invention shown in the drawing, these details are not intended to limit the scope of the invention as claimed in the appended claims.

What is claimed is:

1. A computer implemented method for implementing pushdown queries in a distributed object management system comprising the steps of:

performing a pushdown query to a system datastore of a query type returning a single object;

responsive to said pushdown query, checking whether the system datastore finds a match;

responsive to the system datastore finding the match; checking whether the match refers to an object changed in the current transaction from an in-memory object manager, responsive to the match not referring to a changed object, returning the object;

responsive to the match referring to the changed object, checking whether the changed object matches the pushdown query;

responsive to the changed object matching the pushdown query, returning the changed object;

responsive to the system datastore not finding the match; obtaining a list of changed objects in a current transaction from said in-memory object manager, each of said changed objects being in a current transactional state; and performing an object query on said changed objects.

2. A computer implemented method for implementing pushdown queries as recited in claim 1 wherein the step of performing said object query on said changed objects, further includes the steps of checking for a match and responsive to an identified match, returning the object.

3. A computer implemented method for implementing pushdown queries as recited in claim 2 includes the step of responsive to no match, no object is found to return.

4. A computer implemented method for implementing pushdown queries as recited in claim 1 further includes the step of performing a multiple object pushdown query to a system datastore of a query type returning multiple objects.

5. A computer implemented method for implementing pushdown queries as recited in claim 4 further includes the steps of responsive to said multiple object pushdown query, checking whether the system datastore finds one or more matches;

responsive to the system datastore finding one or more matches, obtaining a list of changed objects in a current transaction from said in-memory object manager, each of said changed objects being in a current transactional state;

performing an object query on said changed objects from the list; and merging and returning results of said one or more matches from said pushdown query and matches from said object query on said changed objects from the list.

6. A computer implemented method for implementing pushdown queries as recited in claim 5 further includes the steps of responsive to finding no changed objects, returning results of said one or more matches from said pushdown query.

7. A computer implemented method for implementing pushdown queries as recited in claim 4 further includes the steps of responsive to said multiple object pushdown query, checking whether the system datastore finds one or more matches;

responsive to the system datastore finding no matches, obtaining a list of changed objects in a current transaction from said in-memory object manager, each of said changed objects being in a current transactional state;

performing an object query on said changed objects from the list; and returning results of matches from said object query on said changed objects from the list.

8. A computer program product for implementing pushdown queries in a distributed object management system, said computer program product including a plurality of computer executable instructions stored on a computer readable medium, wherein said instructions, when executed by said computer, cause the computer to perform the steps of:

performing a pushdown query to a system datastore of a query type returning a single object;

responsive to said pushdown query, checking whether the system datastore finds a match;

responsive to the system datastore finding the match; checking whether the match refers to an object changed in the current transaction from an in-memory object manager, responsive to the match not referring to a changed object, returning the object;

responsive to the match referring to the changed object, checking whether the changed object matches the pushdown query;

responsive to the changed object matching the pushdown query, returning the changed object;

responsive to the system datastore not finding the match; obtaining a list of changed objects in a current transaction from said in-memory object manager, each of said changed objects being in a current transactional state; and performing an object query on said changed objects.

9. A computer program product for implementing pushdown queries in a distributed object management system as recited in claim 8 wherein said instructions, when executed by said computer, further cause the computer to perform the steps of checking for a match from said object query on said changed objects and responsive to an identified match, returning the object.

10. A computer program product for implementing pushdown queries in a distributed object management system as recited in claim 8 wherein said instructions, when executed by said computer, further cause the computer to perform the steps of performing a multiple object pushdown query to a system datastore of a query type returning multiple objects; and responsive to said multiple object pushdown query, checking whether the system datastore finds one or more matches.

11. A computer program product for implementing pushdown queries in a distributed object management system as recited in claim 10 wherein said instructions, when executed by said computer, further cause the computer to perform the steps of responsive to the system datastore finding one or more matches, obtaining a list of changed objects in a current transaction from said in-memory object manager, each of said changed objects being in a current transactional state;

performing an object query on said changed objects from the list; and merging and returning results of said one or more matches from said pushdown query and matches from said object query on said changed objects from the list.

12. A computer program product for implementing pushdown queries in a distributed object management system as recited in claim 10 wherein said instructions, when executed by said computer, further cause the computer to perform the steps of responsive to the system datastore finding no matches, obtaining a list of changed objects in a current transaction from said in-memory object manager, each of said changed objects being in a current transactional state;

performing an object query on said changed objects from the list; and returning results of matches from said object query on said changed objects from the list.

\* \* \* \* \*